(12) United States Patent
Wright

(10) Patent No.: US 10,351,201 B1
(45) Date of Patent: Jul. 16, 2019

(54) PERSONAL MOBILITY SHOPPING CART

(71) Applicant: Chester Wright, Friendswood, TX (US)

(72) Inventor: Chester Wright, Friendswood, TX (US)

( * ) Notice: Subject to any disclaimer, the term of this patent is extended or adjusted under 35 U.S.C. 154(b) by 72 days.

(21) Appl. No.: 15/791,553

(22) Filed: Oct. 24, 2017

Related U.S. Application Data

(60) Provisional application No. 62/496,848, filed on Nov. 1, 2016.

(51) Int. Cl.
| | |
|---|---|
| B62K 5/007 | (2013.01) |
| B62K 19/16 | (2006.01) |
| B62J 7/06 | (2006.01) |
| B62J 11/00 | (2006.01) |
| B62J 1/12 | (2006.01) |
| B60L 11/18 | (2006.01) |
| B62K 19/46 | (2006.01) |
| B62K 19/32 | (2006.01) |

(52) U.S. Cl.
CPC .............. *B62K 5/007* (2013.01); *B60L 11/18* (2013.01); *B62J 1/12* (2013.01); *B62J 7/06* (2013.01); *B62J 11/00* (2013.01); *B62K 19/32* (2013.01); *B62K 19/46* (2013.01); *B60L 2200/24* (2013.01); *B62K 2208/00* (2013.01)

(58) Field of Classification Search
CPC ..... B62K 5/007; B62K 19/46; B60L 2200/24; Y10S 280/04
USPC ................... 180/65.1, 65.51, 22; 280/DIG. 4
See application file for complete search history.

(56) References Cited

U.S. PATENT DOCUMENTS

| | | | |
|---|---|---|---|
| 4,020,916 A * | 5/1977 | Noble ...................... | B60K 1/00 180/315 |
| 4,096,920 A * | 6/1978 | Heyn ..................... | B62B 5/0026 180/11 |
| 4,771,840 A * | 9/1988 | Keller ................... | B62B 5/0026 180/11 |
| 5,912,545 A | 6/1999 | Monet | |
| D494,510 S | 8/2004 | Tsai | |
| 7,023,177 B1 * | 4/2006 | Bussinger ............... | B60L 50/66 320/109 |
| 7,341,121 B2 | 3/2008 | Flowers | |
| 7,699,128 B1 | 4/2010 | Strauss | |
| 7,841,436 B2 | 11/2010 | Bussiner | |
| 2003/0085064 A1 * | 5/2003 | Turner .................. | B60K 7/0007 180/65.51 |
| 2009/0095547 A1 | 4/2009 | Swett | |
| 2010/0059303 A1 * | 3/2010 | Paolacci ................ | A61G 3/061 180/253 |

(Continued)

*Primary Examiner* — Keith J Frisby
(74) *Attorney, Agent, or Firm* — Kyle A. Fletcher, Esq.

(57) ABSTRACT

The personal mobility shopping cart is a vehicle intended for use in a retail environment by a person with a disability. The cart is electrically motorized and powered from self-contained batteries. The cart provides a wheel or castor at each corner of the frame to provide high stability and use a central steerable wheel to guide the cart. A large, grocery cart sized basket and flat grill space under the basket allow the driver to collect items intended to be purchased. The cart provides a brake to prevent motion and a USB charging port for recharging a cell phone. An optional oxygen bottle holder on the rear of the cart allows the driver to have access to oxygen while shopping.

18 Claims, 5 Drawing Sheets

(56) References Cited

U.S. PATENT DOCUMENTS

2013/0098698 A1* 4/2013 Johnson ............... A47L 11/10
180/65.1

* cited by examiner

US 10,351,201 B1

PERSONAL MOBILITY SHOPPING CART

CROSS REFERENCES TO RELATED APPLICATIONS

This application claims the benefit of U.S. Provisional Application No. 62/496,848, filed Nov. 1, 2016 by the applicant Chester Wright.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mobile devices for people with disabilities, more specifically, a personal mobility shopping cart.

SUMMARY OF INVENTION

The personal mobility shopping cart is a vehicle intended for use in a retail environment by a person with a disability. The cart is electrically motorized and powered from self-contained batteries. The cart provides a wheel or castor at each corner of the frame to provide high stability and use a central steerable wheel to guide the cart. A large, grocery cart sized basket and flat grill space under the basket allow the driver to collect items intended to be purchased. The cart provides a brake to prevent motion and a USB charging port for recharging a cell phone. An optional oxygen bottle holder on the rear of the cart allows the driver to have access to oxygen while shopping.

An object of the invention is to provide an electrically motorized cart for a person with a disability.

Another object of the invention is to provide a wheel or caster at each corner of the frame for stability of the cart.

A further object of the invention is to provide a central, steerable wheel.

Yet another object of the invention is to provide an optional oxygen bottle holder.

These together with additional objects, features and advantages of the personal mobility shopping cart will be readily apparent to those of ordinary skill in the art upon reading the following detailed description of the presently preferred, but nonetheless illustrative, embodiments when taken in conjunction with the accompanying drawings.

In this respect, before explaining the current embodiments of the personal mobility shopping cart in detail, it is to be understood that the personal mobility shopping cart is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the personal mobility shopping cart.

It is therefore important that the claims be regarded as including such equivalent construction insofar as they do not depart from the spirit and scope of the personal mobility shopping cart. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
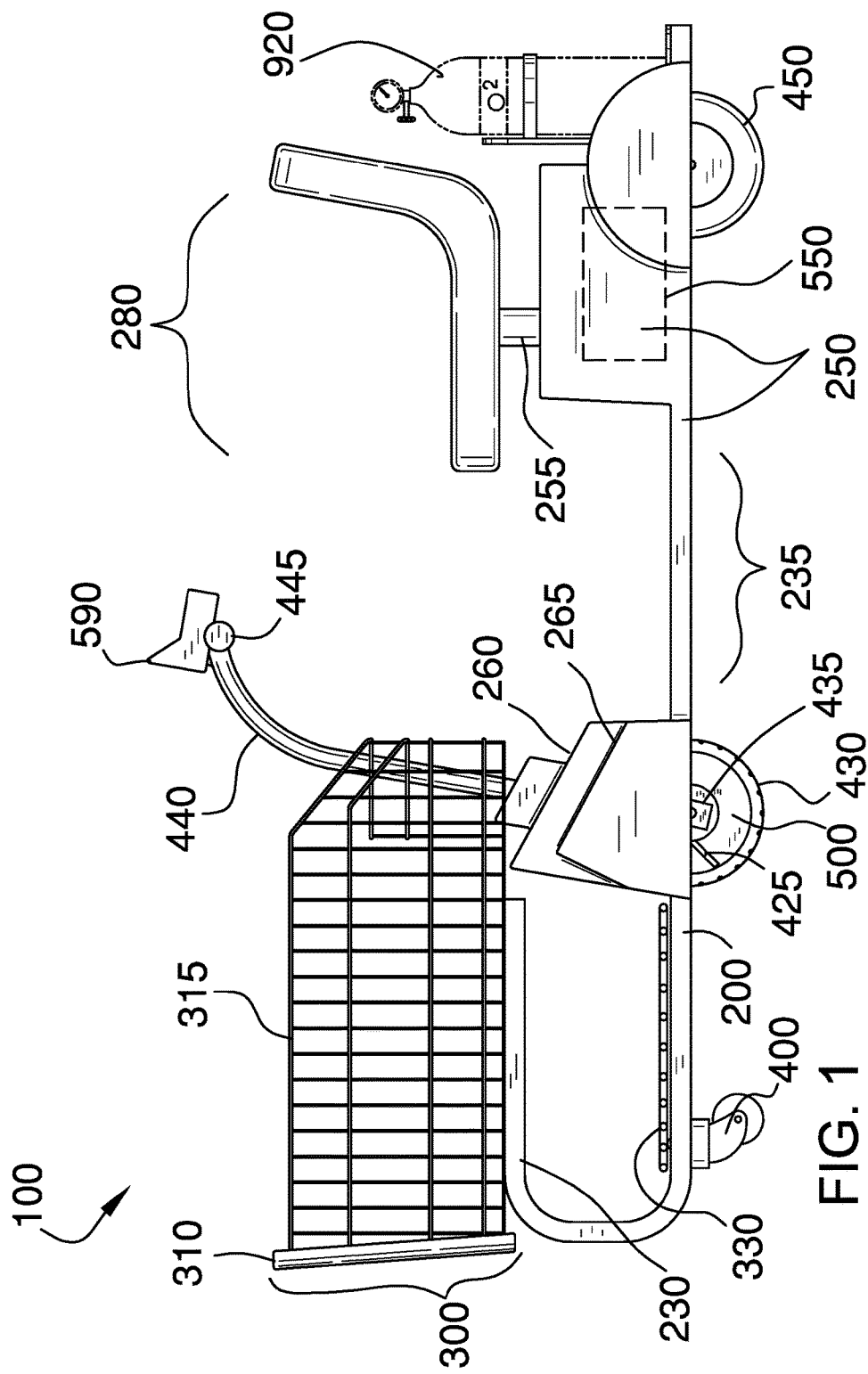
FIG. 1 is a side view of an embodiment of the disclosure.
Figure 2:
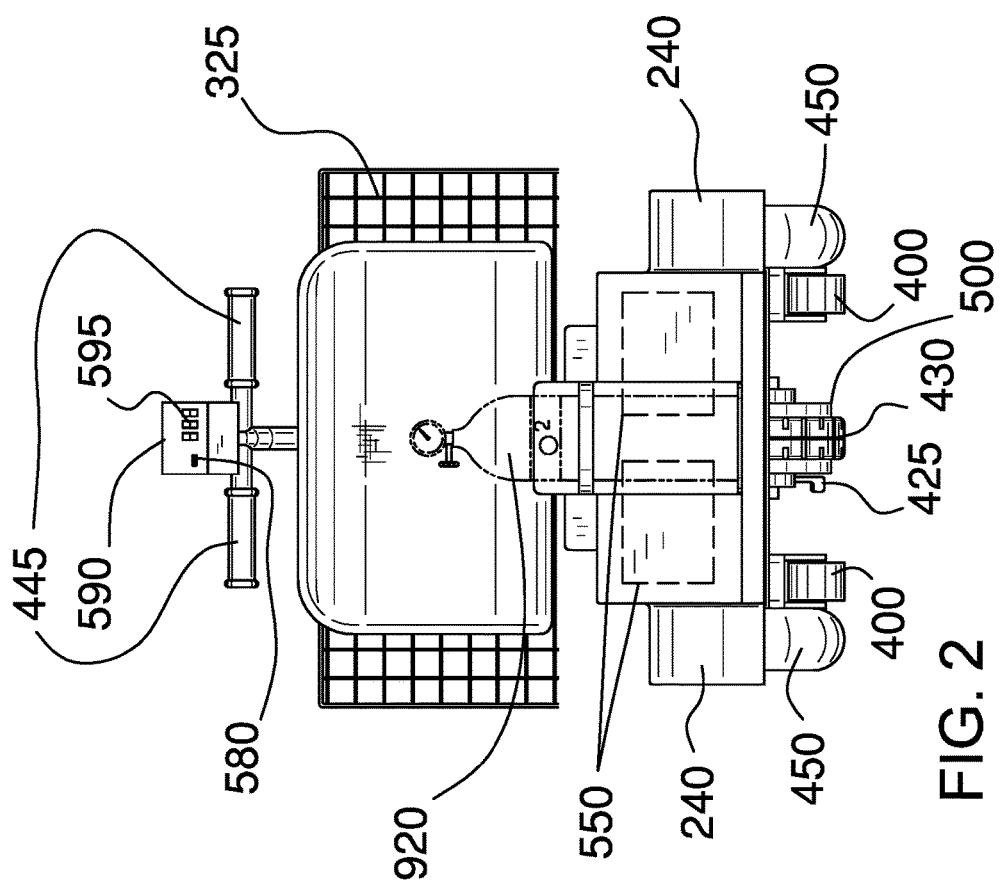
FIG. 2 is a rear view of an embodiment of the disclosure.
Figure 3:
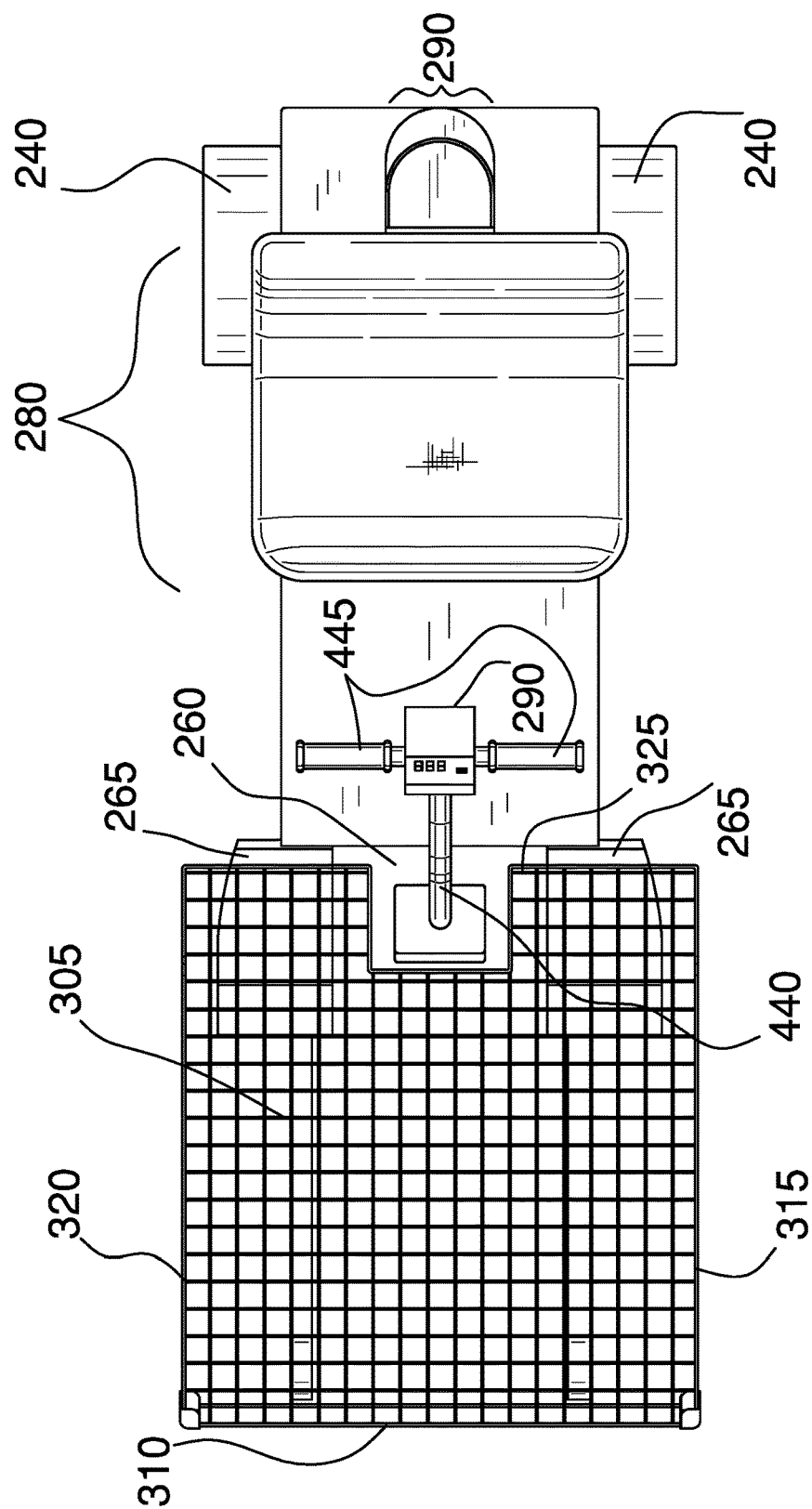
FIG. 3 is a top view of an embodiment of the disclosure.
Figure 4:
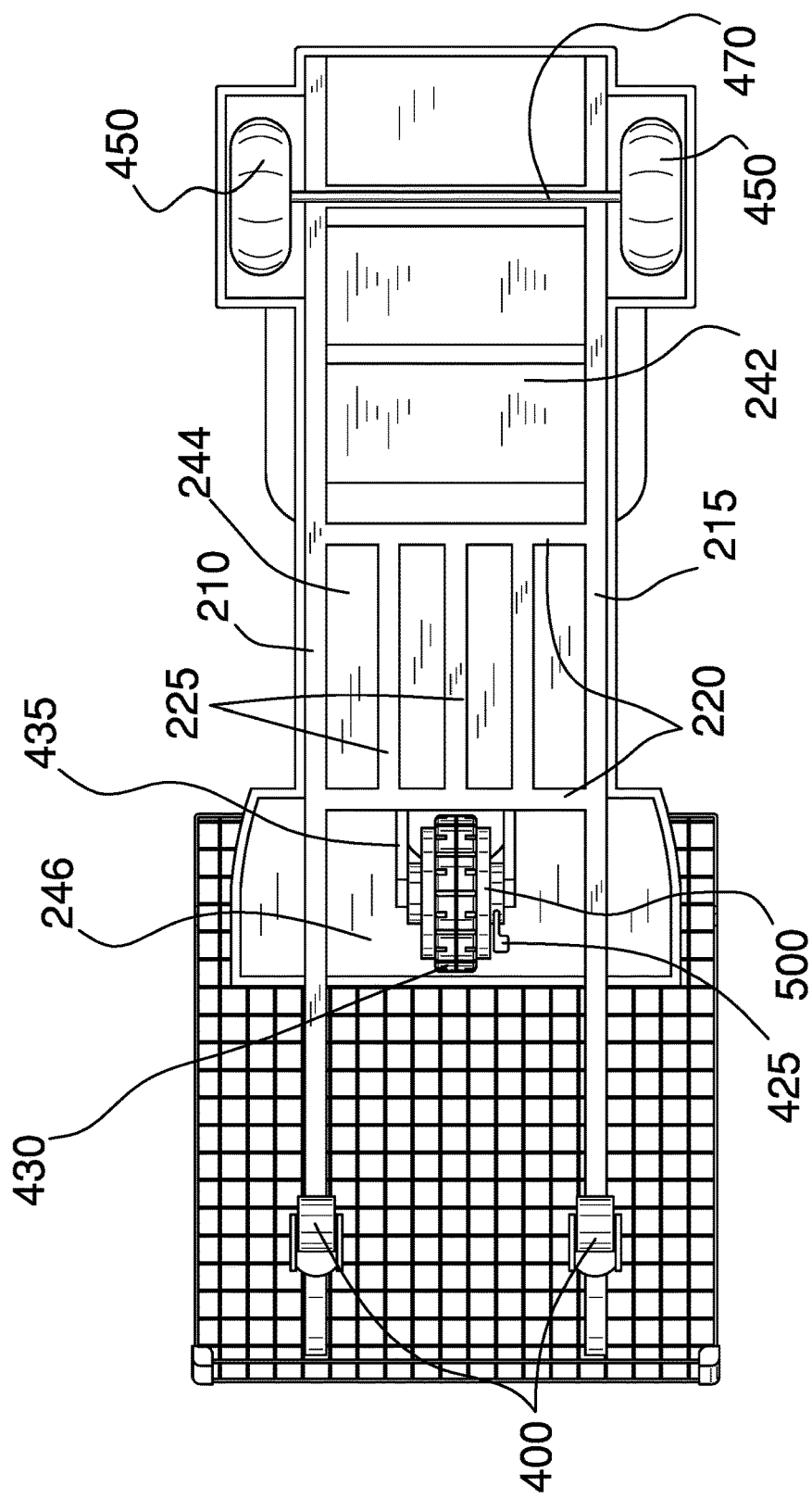
FIG. 4 is a bottom view of an embodiment of the disclosure.
Figure 5:
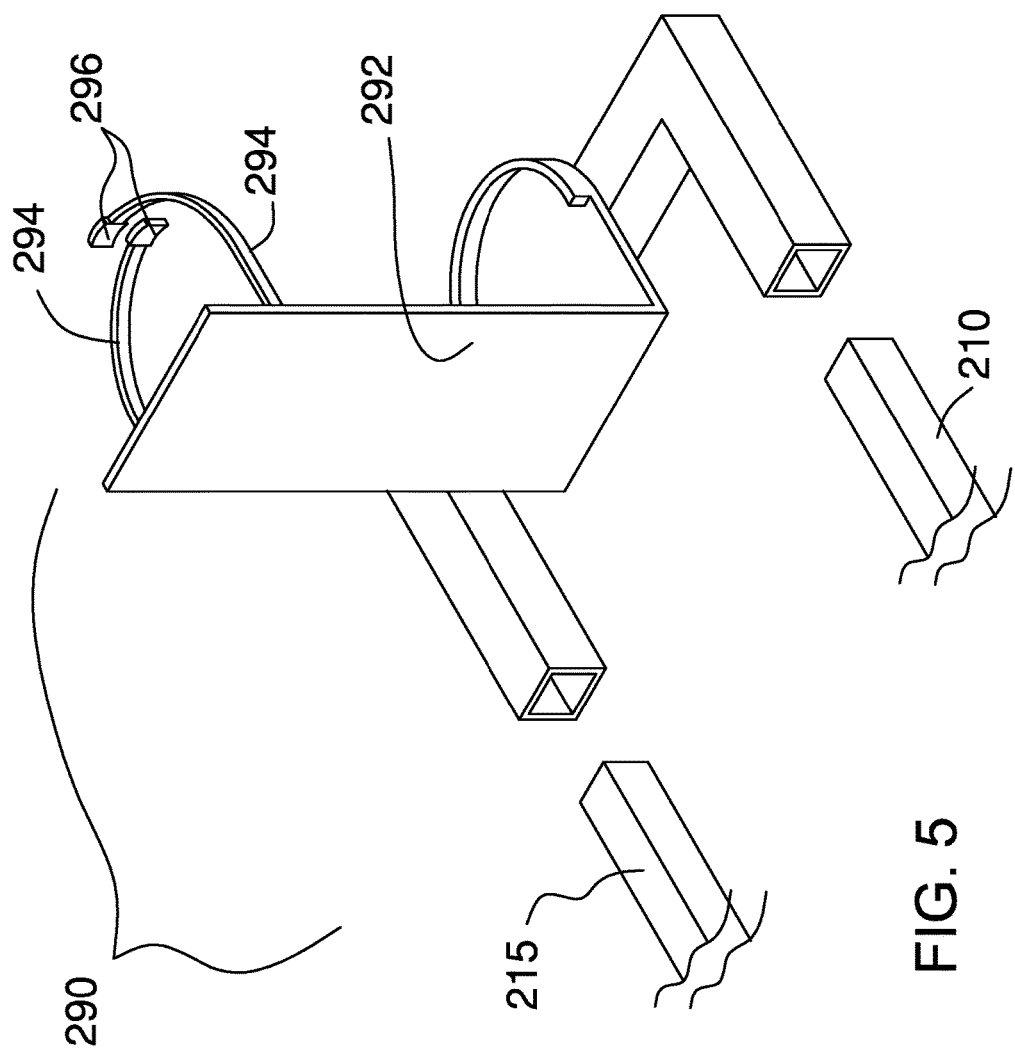
FIG. 5 is a detail view of an embodiment of the disclosure focusing on the oxygen bottle holder.

Detailed reference will now be made to a first potential embodiment of the disclosure, which is illustrated in FIGS. 1 through 5.

The personal mobility shopping cart 100 (hereinafter invention) comprises a frame 200, a body 250, a seat 280, a basket 300, a pair of front castors 400, a pair of rear wheels 450, a steerable wheel 430, an electric motor 500, one or more batteries 550, and a control box 590. The invention 100 is a motorized shopping cart powered by the one or more batteries 550. The steerable wheel 430 operable by moving a steering post 440 is centrally located on the invention 100 and provides for easy steering by a driver (not illustrated in the figures), who may be disabled. The pair of front castors 400 and the pair of rear wheels 450 are located at front and rear corners of the invention 100 and thus provide a high level of stability. The basket 300 that is larger than those typically provided on a motorized cart is positioned for easy access by the driver.

The frame 200 comprises a left longitudinal frame member 210, a right longitudinal frame member 215, a plurality of lateral frame members 220, and a plurality of floorboard frame members 225. The left longitudinal frame member 210 and the right longitudinal frame member 215 provide support for the invention 100 from front to back. The left longitudinal frame member 210 and the right longitudinal frame member 215 are separated by and coupled to the plurality of lateral frame members 220. The left longitudinal frame member 210 and the right longitudinal frame member 215 determine the overall length of the invention 100 and the plurality of lateral frame members 220 determine the width of the invention 100.

The frontmost portion of the left longitudinal frame member 210 and the frontmost portion of the right longitudinal frame member 215 are bent into a 'U' shape to form a basket support 230. This may involve the frontmost 2 to 3 ft of the left longitudinal frame member 210 and the right longitudinal frame member 215. The specific length of the left longitudinal frame member 210 and the right longitudinal frame member 215 involved in the bend for the basket support 230 depends upon the desired height and length of the basket 300. As a non-limiting example, if the basket 300 is to be 16 inches above the frame 200 and 18 inches of support length is needed under the basket support 230, then approximately 34 inches of the left longitudinal frame member 210 and 34 inches of the right longitudinal frame member 215 will be bent to form the basket support 230.

The plurality of lateral frame members 220 may be placed at locations where higher levels of mechanical strain or weight are expected. As non-limiting examples, the plurality of lateral frame members 220 may be placed at the front of the frame 200, just behind the steerable wheel 430, at the front and rear of a floorboard 235, at the front and rear of the one or more batteries 550, and at rear in the vicinity of a rear axle 470. Note that some of the locations listed may be the same for certain embodiments. As a non-limiting example, in some embodiment the rear of the one or more batteries 550 and the vicinity of the rear axle 470 may be at the same location and may use the same lateral frame member.

The floorboard 235 is the area of the frame 200 that is located between the seat 280 and the steerable wheel 430. The floorboard 235 may support the full weight of the driver as they mount and dismount the invention 100 and therefore the floorboard 235 may comprise the plurality of floorboard frame members 225 coupled to two or more of the plurality of lateral frame members 220.

The frame 200 may be fabricated from tubular metal frame members that are welded together. The left longitudinal frame member 210 and the right longitudinal frame member 215 may be exposed at the rear of the invention 100 to allow attachment of an oxygen bottle holder 290. A plurality of steel plates may be mounted to the frame 200 at various places where downward pressure or weight is expected. As non-limiting examples, a battery support plate 242 may be mounted to the frame under the one or more batteries 550, a floorboard support plate 244 may be mounted to the frame at the floorboard 235, and a front wheel steering support plate 246 may be mounted to the frame above the steerable wheel 430.

The body 250 may comprise a fiberglass covering over the frame 200. The body 250 may improve the appearance of the invention 100 and may provide a protective barrier between the driver and moving or electrically energized components. As non-limiting examples, moving or electrically energized components may include the steerable wheel 430, the pair of rear wheels 450, the one or more batteries 550, the rear axle 470, and wiring (not illustrated in the figures).

The body 250 may specifically comprise a covering over the floorboard 235, a pair of fenders 240 over the pair of rear wheels 450, a covering over the one or more batteries 550, a front wheel well 260, and a pair of footrests 265.

The seat 280 may be a place for the driver to sit while operating the invention 100. The seat 280 may comprises a seat bottom and a seat back, both of which may be upholstered or padded. The bottom of the seat 280 may be coupled to a seat riser post 255, which in turn is coupled to the frame 200. The seat 280 may comprise an adjustment that allows the front to back position of the seat 280 to be adjusted. The seat riser post 255 may comprise an adjustment that allows the up/down position of the seat 280 to be adjusted.

The basket 300 may comprise a wire grill container for holding items that the driver intends to purchase. The basket 300 comprises a basket bottom 305, a basket front side 310, a basket left side 315, a basket right side 320, and a basket rear side 325, with an open top. The basket rear side 325 may include a 'U' shaped bend (as seen from above) to permit the basket 300 to wrap around the steering post 440 and thus extend closer to the driver on each side. Because of the stability provided by four corner wheels/castors and central steering, the basket 300 may be comparable in size to a basket of a normal grocery store shopping cart, as opposed to the small baskets normally found on motorized shopping carts.

A flat grill 330 may be mounted to the frame 200 below the basket 300. The flat grill 330 supplements the storage space provided by the basket 300 by providing additional storage space beneath the basket 300 for large or bulky items.

The pair of front castors 400 are swiveling wheels that are mounted at the left front and right front corner of the frame 200 on the underside of the frame 200. In general, each castor of the pair of front castors 400 are smaller in diameter than the steerable wheel 430 or the pair of rear wheels 450.

The pair of rear wheels 450 are non-steerable wheels mounted on opposing ends of the rear axle 470 at the rear of the frame 200. For increased stability, the pair of rear wheels 450 are positioned on the outside of the frame 200.

The steerable wheel 430 may be located centrally on the frame 200. Specifically, the steerable wheel 430 may be ½ of the way across the frame 200 laterally and under the rear of the basket 300 from front to back. The steerable wheel 430 is rotationally coupled to a steering fork 435, which in turn is coupled to the steering post 440. The steering post 440 may pass thru and may be pivotally mounted to a steel plate. The steering post 440 may pass through the steel plate mounted above the steerable wheel 430. The steering post 440 may extend upwards and then curve or turn towards the driver. A pair of hand grips 445 may be mounted at the top end of the steering post 440. The pair of hand grips 445 may extend horizontally in opposing directions from the top of the steering post 440, forming a 'T' shape top for the steering post 440. The driver may steer the invention 100 by using the pair of hand grips 445 to move the top of the steerable wheel 430 left or right.

The electric motor 500 causes rotation of the steerable wheel 430 when energized. Based upon the polarity of the voltage that is energizing the electric motor 500, the steerable wheel may rotate in a direction that moves the invention 100 forward or backwards. The electric motor 500 may be mounted within the steerable wheel 430, on the side of the steerable wheel 430, or at the end of a front axle (not illustrated in the figures).

The one or more batteries 550 provide electrical energy to power the electric motor 500 and a USB port 580. In some embodiments, the one or more batteries 550 may comprise one or more lead acid batteries. If more than one individual battery is used, the individual batteries may be wired in serial and/or in parallel to provide the voltage or current required by the electric motor 500 being used. The one or more batteries 550 may be mounted to the frame 200 under the seat 280 and may be covered by the body 250. The one or more batteries 550 may be recharged upon plugging a recharging adapter (not shown in the illustrations) into a recharging port (not shown in the illustrations) provided the invention 100 is not being used.

The control box 590 may be mounted to the top of the steering post 440 where it is accessible to the driver. The control box 590 may be a housing for a plurality of control switches 595 and the USB port 580. The plurality of control switches 595 may be wired to the one or more batteries 550 and to the electric motor 500. The plurality of control switches 595 may allow the driver to determine when the electric motor 500 is energized and the polarity of the energization. This in turn may determine whether the invention 100 moves and the direction of the movement. The USB port 580 may be wired to the one or more batteries 550 via a voltage regulation circuit to provide a place where the driver may recharge a cell phone (not illustrated in the figures).

The invention 100 may comprise a brake 425. The brake 425 may be an electrically repositionable pad that applies frictional pressure against the steerable wheel 430 in order to reduce the speed of or to stop motion of the invention 100. The brake 425 may default to grasping the steerable wheel 430 and thus preventing movement until energized by the application of a voltage. In some embodiments, the brake 425 may default to not grasping the steerable wheel 430 and thus allowing movement until energized by the application of a voltage.

The invention 100 may comprise the oxygen bottle holder 290. The oxygen bottle holder 290 may comprise an upright bottle support 292 with a strap 294 and a buckle 296 for holding an oxygen bottle 920 against the upright bottle support 292. In some embodiment, the oxygen bottle holder 290 may be detachable from the invention 100. As a non-limiting example, the bottom of the oxygen bottle holder 290 may comprise a tubular framework constructed from material that has a larger diameter than the tubing used to construct the frame 200 such that the oxygen bottle holder 290 may slide over the rear of the frame 200.

In use, the driver may adjust the seat 280 of the invention 100 to a height and forward position that is comfortable for them. The driver may stand on the floorboard 235 in the process of climbing into the seat 280. The driver may place their feet on the floorboard 235 or onto the pair of footrests 265 that are part of the body 250. The driver may activate one of the plurality of control switches 595 to apply power to the invention 100 in embodiments that include a power on/off control. The driver may activate another of the plurality of control switches 595 to release the brake 425. The driver may activate yet others of the plurality of control switches 595 to select a direction of travel and to energize the electric motor 500. The driver may steer the invention 100 by adjusting the position of the top of the steering post 440 from side to side. As the driver selects items to purchase, the driver may place the items into the basket 300 or under the basket 300 onto the flat grill 330. The driver may plug a charging cable (not illustrated in the figures) between the USB port 580 on the control box 590 and the cell phone in their possession to allow the cell phone to charge while they shop. If the driver uses oxygen, the oxygen bottle 920 may be secured in the oxygen bottle holder 290 behind the seat 280. When the driver is done shopping and no longer needs the invention 100, they may activate the brake 425 and remove power by using the plurality of control switches 595 on the control box 590.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "axle" is a cylindrical shaft that is inserted through the center of an object such that the center axis of the object and the center axis of the axle are aligned and the object can rotate using the axle as an axis of rotation.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may be construed to mean recharging or replacing individual cells, individual batteries of cells, or a package of multiple battery cells as is appropriate for any given battery technology that may be used.

As used in this disclosure, the term "body" refers to the structure that forms the exterior surfaces of a vehicle. The body may be formed from a plurality of panels.

As used in this disclosure, a "brake" is a device that is used to slow or stop the motion of a machine or a vehicle.

As used in this disclosure, the word "buckle" refers to any fastener that is used for joining a first loose end of a strap to a second loose end of the same strap or to a loose end of a different strap.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", mean connected, either directly or indirectly and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, an "electric motor" is a device that converts electric energy into rotational mechanical energy.

As used herein, the word "energization" refers to the act of energizing an electrical component or electrical subsystem.

As used herein, "front" means 1) the side of a vehicle that is closest to a forward direction of travel under normal use of the vehicle or 2) the side or part of an object that normally presents itself to view or that is normally used first. "Rear" or "back" is the side opposite the front.

As used in this disclosure, a "housing" is a rigid casing that encloses and protects one or more devices.

As used in this disclosure, the term "lateral" refers to the movement of an object that is perpendicular to the previously determined or expected direction of movement of the object.

As used herein, the word "longitudinal" refers to a lengthwise direction.

As used in this disclosure, a "plate" is a smooth, flat and rigid object having at least one dimension that: 1) is of uniform thickness; and 2) that appears thin relative to the other dimensions of the object. Plates often have a rectangular or disk like appearance. As defined in this disclosure, plates may be made of any material, but are commonly made of metal.

As used in this disclosure a "strap" is a strip of leather, cloth, plastic, thin metal, or other flexible material, often with a buckle, that is used to fasten, secure, carry, or hold onto something.

As used in this disclosure, "USB" is an acronym for Universal Serial Bus, which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

As used in this disclosure, a "wire" is a structure with the general appearance of a cord or strand but that: 1) may not have the tensile or compressive characteristics of a cord; and, 2) is made from an electrically conductive material.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A personal mobility shopping cart comprising:

a frame, a body, a seat, a basket, a pair of front castors, a pair of rear wheels, a steerable wheel, an electric motor, one or more batteries, and a control box;

wherein the personal mobility shopping cart is a motorized shopping cart powered by the one or more batteries;

wherein the steerable wheel operable by moving a steering post is centrally located on the personal mobility shopping cart;

wherein the pair of front castors and the pair of rear wheels are located at front and rear corners of the personal mobility shopping cart and thus provide stability.

2. The personal mobility shopping cart according to claim 1 wherein the frame comprises a left longitudinal frame member, a right longitudinal frame member, a plurality of lateral frame members, and a plurality of floorboard frame members;

wherein the left longitudinal frame member and the right longitudinal frame member provide support for the personal mobility shopping cart from front to back;

wherein the left longitudinal frame member and the right longitudinal frame member are separated by and coupled to the plurality of lateral frame members;

wherein the left longitudinal frame member and the right longitudinal frame member determine the overall length of the personal mobility shopping cart and the plurality of lateral frame members determine the width of the personal mobility shopping cart;

wherein the frontmost 2 to 3 ft of the left longitudinal frame member and the frontmost 2 to 3 ft of the right longitudinal frame member are bent into a 'U' shape to form a basket support;

wherein the plurality of lateral frame members are placed at locations where mechanical strain or weight are expected.

3. The personal mobility shopping cart according to claim 2 wherein a floorboard is located between the seat and the steerable wheel;

wherein the floorboard comprises the plurality of floorboard frame members coupled to two or more of the plurality of lateral frame members;

wherein the floorboard is adapted to support the full weight of a driver as they mount and dismount the personal mobility shopping cart;

wherein the frame is fabricated from tubular metal frame members that are welded together;

wherein the left longitudinal frame member and the right longitudinal frame member are exposed at the rear of the personal mobility shopping cart to allow attachment of an oxygen bottle holder;

wherein a plurality of steel plates are mounted to the frame at places where downward pressure or weight is expected;

wherein a battery support plate is mounted to the frame under the one or more batteries, a floorboard support plate is mounted to the frame at the floorboard, and a front wheel steering support plate is mounted to the frame above the steerable wheel.

4. The personal mobility shopping cart according to claim 3 wherein the body comprises a fiberglass covering over the frame;

wherein the body improves the appearance of the personal mobility shopping cart and is adapted to provide a protective barrier between the driver and moving or electrically energized components.

5. The personal mobility shopping cart according to claim 4 wherein the body comprises a covering over the floorboard, a pair of fenders over the pair of rear wheels, a covering over the one or more batteries, a front wheel well, and a pair of footrests.

6. The personal mobility shopping cart according to claim 4
wherein the seat comprises a seat bottom and a seat back;
wherein the bottom of the seat is coupled to a seat riser post;
wherein the seat riser post is coupled to the frame.

7. The personal mobility shopping cart according to claim 6
wherein the basket comprises a wire grill container adapted to hold items that the driver intends to purchase;
wherein the basket comprises a basket bottom, a basket front side, a basket left side, a basket right side, and a basket rear side;
wherein the basket comprises an open top;
wherein the basket rear side includes a 'U' shaped bend wrapping the basket around the steering post;
wherein the basket is the size of a basket of a grocery store shopping cart.

8. The personal mobility shopping cart according to claim 7
wherein a flat grill is mounted to the frame below the basket;
wherein the flat grill supplements the storage space provided by the basket by providing additional storage space beneath the basket.

9. The personal mobility shopping cart according to claim 8
wherein the pair of front castors are swiveling wheels that are mounted at the left front and right front corner of the frame on the underside of the frame;
wherein each castor of the pair of front castors are smaller in diameter than the steerable wheel or the pair of rear wheels.

10. The personal mobility shopping cart according to claim 9
wherein the pair of rear wheels are non-steerable wheels mounted on opposing ends of a rear axle;
wherein the pair of rear wheels are positioned on the outside of the frame.

11. The personal mobility shopping cart according to claim 10
wherein the steerable wheel is located ½ of the way across the frame laterally and under the rear of the basket from front to back;
wherein the steerable wheel is rotationally coupled to a steering fork;
wherein the steering fork is coupled to the steering post;
wherein the steering post extends upwards and then turns towards the rear;
wherein a pair of hand grips is mounted at the top end of the steering post;
wherein the pair of hand grips extends horizontally in opposing directions from the top of the steering post, forming a 'T' shape top for the steering post;
wherein the personal mobility shopping cart is steered by using the pair of hand grips to move the top of the steerable wheel left or right.

12. The personal mobility shopping cart according to claim 11
wherein the electric motor causes rotation of the steerable wheel when energized;
wherein based upon the polarity of the voltage that is energizing the electric motor, the steerable wheel rotates in a direction that moves the personal mobility shopping cart forward or backwards;
wherein the electric motor is mounted within the steerable wheel, on the side of the steerable wheel, or at the end of a front axle.

13. The personal mobility shopping cart according to claim 12
wherein the one or more batteries provide electrical energy to power the electric motor and a USB port.

14. The personal mobility shopping cart according to claim 13
wherein the one or more batteries comprise one or more lead acid batteries;
wherein the individual batteries are wired in serial and/or in parallel to provide the voltage or current required by the electric motor being used;
wherein the one or more batteries is mounted to the frame under the seat and are covered by the body.

15. The personal mobility shopping cart according to claim 13
wherein the control box is mounted to the top of the steering post;
wherein the control box is a housing for a plurality of control switches and the USB port;
wherein the plurality of control switches is wired to the one or more batteries and to the electric motor;
wherein the plurality of control switches energize the electric motor and determine the polarity of the energization.

16. The personal mobility shopping cart according to claim 15
wherein the personal mobility shopping cart comprises a brake;
wherein the brake is an electrically repositionable pad that applies frictional pressure against the steerable wheel in order to reduce the speed of or to stop motion of the personal mobility shopping cart.

17. The personal mobility shopping cart according to claim 16
wherein the personal mobility shopping cart comprises the oxygen bottle holder;
wherein the oxygen bottle holder comprises an upright bottle support with a strap and a buckle for holding an oxygen bottle against the upright bottle support.

18. The personal mobility shopping cart according to claim 17 wherein the oxygen bottle holder is detachable from the personal mobility shopping cart.

* * * * *